US012597422B2

(12) United States Patent
Guo et al.

(10) Patent No.: US 12,597,422 B2
(45) Date of Patent: Apr. 7, 2026

(54) SPEAKING PRACTICE SYSTEM WITH RELIABLE PRONUNCIATION EVALUATION

(71) Applicant: VIA TECHNOLOGIES, INC., New Taipei City (TW)

(72) Inventors: Jing-Jing Guo, Shanghai (CN); Steve Shu Liu, Shanghai (CN)

(73) Assignee: VIA TECHNOLOGIES, INC., New Taipei City (TW)

( * ) Notice: Subject to any disclaimer, the term of this patent is extended or adjusted under 35 U.S.C. 154(b) by 189 days.

(21) Appl. No.: 18/399,876

(22) Filed: Dec. 29, 2023

(65) Prior Publication Data

US 2024/0347054 A1 Oct. 17, 2024

(30) Foreign Application Priority Data

Apr. 14, 2023 (CN) ......................... 202310398141.2

(51) Int. Cl.
*G10L 15/187* (2013.01)
*G06N 3/02* (2006.01)
(Continued)

(52) U.S. Cl.
CPC .............. *G10L 15/187* (2013.01); *G06N 3/02* (2013.01); *G09B 17/006* (2013.01); *G10L 25/51* (2013.01); *G10L 15/16* (2013.01)

(58) Field of Classification Search
CPC ....... G10L 15/16; G10L 15/187; G10L 25/51; G09B 17/006; G09B 19/04; G09B 19/06
(Continued)

(56) References Cited

U.S. PATENT DOCUMENTS

2015/0371627 A1 12/2015 Lee
2018/0190269 A1* 7/2018 Lokeswarappa ....... G09B 19/06
(Continued)

FOREIGN PATENT DOCUMENTS

CN 110782921 A 2/2020
CN 114417832 A 4/2022
(Continued)

OTHER PUBLICATIONS

Mu, Deguo, et al. "Japanese pronunciation evaluation based on DDNN." IEEE Access 8. Dec. 2020, pp. 218644-218657. (Year: 2020).*
(Continued)

*Primary Examiner* — James S Wozniak
(74) *Attorney, Agent, or Firm* — McClure, Qualey & Rodack, LLP

(57) ABSTRACT

Goodness of pronunciation (GOP) evaluation techniques with improved reliability are presented. A data preprocessing server operates a data pre-processing system and a GOP evaluation system. The data pre-processing system includes a phonetic symbol generation system and an audio recording preprocessing system. Based on a practice text as well as an audio recording of the user reading the practice text, the phonetic symbol generation system generates phonetic symbols, and the audio recording preprocessing system generates audio data. The GOP evaluation system scores the audio recording based on the phonetic symbols and the audio data. The phonetic symbol generation system operates an artificial intelligence model, which generates the phonetic symbols in response to the fact that the practice text includes polyphonic words. Polyphonic words are words with several pronunciations due to their parts of speech, or special words which are numbers or place names.

20 Claims, 9 Drawing Sheets

(51) Int. Cl.
*G09B 17/00* (2006.01)
*G10L 15/16* (2006.01)
*G10L 25/51* (2013.01)

(58) Field of Classification Search
USPC .................................................. 704/232, 270
See application file for complete search history.

(56) References Cited

U.S. PATENT DOCUMENTS

| | | | | |
|---|---|---|---|---|
| 2018/0268739 | A1* | 9/2018 | Chung | G10L 15/02 |
| 2019/0035420 | A1 | 1/2019 | Kirihara | |
| 2019/0236979 | A1* | 8/2019 | Fan | G09B 19/06 |
| 2019/0303437 | A1* | 10/2019 | Guarnieri | G06F 40/253 |
| 2020/0175968 | A1* | 6/2020 | Donati | G10L 15/187 |
| 2020/0184958 | A1* | 6/2020 | Norouzi | G09B 19/04 |
| 2021/0050001 | A1* | 2/2021 | Chen | G06N 3/044 |
| 2021/0082408 | A1* | 3/2021 | Shechtman | G06N 3/045 |
| 2021/0174784 | A1* | 6/2021 | Min | G06N 3/08 |
| 2021/0216862 | A1* | 7/2021 | Liu | G06V 10/764 |
| 2021/0375294 | A1* | 12/2021 | Gu | G10L 19/008 |
| 2022/0093095 | A1* | 3/2022 | Dighe | G10L 15/26 |
| 2022/0343790 | A1 | 10/2022 | Krishnaswamy | |
| 2023/0081306 | A1* | 3/2023 | Kuo | G06N 3/09<br>704/200 |
| 2023/0222161 | A1* | 7/2023 | Wei | G06F 40/258<br>715/719 |
| 2024/0119862 | A1* | 4/2024 | Zheng | G10L 25/18 |
| 2024/0312358 | A1* | 9/2024 | Everest | G09B 7/00 |

FOREIGN PATENT DOCUMENTS

| | | | |
|---|---|---|---|
| CN | 114495912 | A | 5/2022 |
| TW | 200915298 | A | 4/2009 |
| TW | 201140521 | A | 11/2011 |
| TW | 202147237 | A | 12/2021 |

OTHER PUBLICATIONS

Sun, Hao, et al. "Knowledge distillation from bert in pre-training and fine-tuning for polyphone disambiguation." 2019 IEEE Automatic Speech Recognition and Understanding Workshop (ASRU). IEEE, Dec. 2019, pp. 168-175. (Year: 2019).*
Chinese language office action dated Dec. 22, 2023, issued in application No. TW 112119262.
Chinese language office action dated Jan. 23, 2024, issued in application No. TW 112119263.
1 Non-Final Office Action dated Apr. 24, 2025, issued in U.S. Appl. No. 18/399,891.

* cited by examiner

Train in sequence until the accuracy is high enough

Input layer, receiving audio ~202

Feature extraction layer, extracting MFCC features ~204

Normalization layer, normalizing the MFCCs features ~206

Deep neural network (DNN) ~208

Fully-connected layer ~210

Output layer, outputting phonetic symbols ~212

SPEAKING PRACTICE SYSTEM WITH RELIABLE PRONUNCIATION EVALUATION

CROSS REFERENCE TO RELATED APPLICATIONS

This Application claims priority of China Patent Application No. 202310398141.2, filed on Apr. 14, 2023, the entirety of which is incorporated by reference herein.

BACKGROUND OF THE INVENTION

Field of the Invention

The present invention relates to a speaking practice system for language learning, and in particular relates to pronunciation evaluation such as Goodness of Pronunciation (GOP) evaluation.

Description of the Related Art

With the development of computer technology, software for language learning is becoming more and more powerful. Users may prepare various texts for speaking practice. A speaking practice system for language learning may evaluate the completeness, fluency, accuracy, etc. of the user's audio recording to provide feedback to the user to improve his speaking skills. Such a pronunciation evaluation technology is also known as Goodness of Pronunciation (GOP) evaluation.

How to improve the reliability of GOP evaluation and help users to improve their speaking skills is a major issue in this technical field.

BRIEF SUMMARY OF THE INVENTION

This disclosure proposes a speaking practice system with reliable pronunciation evaluation (reliable GOP evaluation).

A speaking practice system with reliable GOP evaluation in accordance with an embodiment of the present disclosure includes a data preprocessing system and a GOP evaluation system running on a data processing server. The data preprocessing system includes a phonetic symbol generation system and an audio recording preprocessing system. According to a practice text as well as an audio recording of the user reading the practice text, the phonetic symbol generation system generates phonetic symbols, and the audio recording preprocessing system generates audio data. The GOP evaluation system scores the audio recording based on the phonetic symbols and the audio data. The phonetic symbol generation system operates an artificial intelligence (AI) model, which generates the phonetic symbols in response to the fact that the practice text includes polyphonic words. Polyphonic words are words with different pronunciations due to their part of speech, or are special words which are numbers or place names.

The AI model recognizes the polyphonic words of the practice text so that the phonetic symbols generated for scoring the practice text conform to the expected pronunciations of the practice text, thereby improving the reliability of the GOP evaluation. The user's mispronunciations may be accurately corrected.

In an embodiment, the AI model includes a plurality of audio-symbol models, wherein each audio-symbol model is provided to correspond to a particular polyphonic word. In response to a practice text being a word text and is polyphonic word, the corresponding audio-symbol model operates to generate the expected phonetic symbols of the polyphonic word based on the audio recording of the user reading the polyphonic word.

In an embodiment, the AI model includes a sentence-symbol model. In response to a practice text being a sentence text and including at least one polyphonic word, the sentence-symbol model operates to generate phonetic symbols based on the sentence text.

In an embodiment, the speaking practice system further has a human-machine interface run on a client device, which allows the user to select a practice text to read out for recording, and upload the practice text as well as the audio recording to the data processing server for GOP evaluation of the audio recording.

A detailed description is given in the following embodiments with reference to the accompanying drawings.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In order to better describe the embodiments of the present invention, the specific terms used in the present invention are firstly defined as below.

Text phoneme sequence: a sequence converted from a text or a sentence, which is delivered to a Goodness of Pronunciation (GOP) evaluation system for comparing and scoring a user's recording audio.

Polyphonic word: a polyphonic words has different pronunciations and each one of the pronunciations corresponds to a part of speech or a special usage, such as employing this polynomic word to indicate a number or a place. For example, in English, "contract" has different stresses when it is a verb (/ˌkən'trækt/) and a noun (/ˈkɑːntrækt/)). Additionally, in Chinese, "都" will be pronounced as (dou) and (du) when it is used as 都市 (which means "city" in English), and 成都 (a city in China).

Confidence value: a confidence value is a score obtained by means of a GOP evaluation according to a user's audio recording when reading a word. Basically, a plurality of confidence values are derived for a user's audio recording and the highest confidence value is selected among these derived ones.

Word segmentation: in Chinese, two or more characters may be combined to describe something else. For example, the subject may be "乒乓球 (ping-pong ball)" if the segmented Chinese sentence is "乒乓球 (ping-pong ball)/拍賣 (auction)/完了 (out)", and the subject may be "乒乓球拍 (ping-pong racket)" if the segmented Chinese sentence, "乒乓 (ping-pong)/球拍 (racket)/賣 (sold)/完了 (out)". The different word segmentation manners result in the different meanings.

Sentence vector: a sentence vector a sentence vector is used in a conventional training phase of an AI language learning system, which has a unitary (or identical) length and is used as vectors mapped from sentence having different length.

A word and a character: a word is composed of at least one characters. A word has its own meaning if we use/say it independently, while a character may not have its own meaning if we use/say it independently or may have different meaning with the word composing it. For example, the English word "train" may be separated into five characters "t", "r", "a", "i", "n" and we may not use/say these five characters to show a meaningful idea independently. Additionally, the Chinese word "汽車 (car)" encompasses two Chinese characters "汽 (vapor)" and "車 (vehicle)" that "汽 (vapor)" and "車 (vehicle)" may individually have different meanings with the word "汽車 (car)" they formed under combinations.

Figure 1:
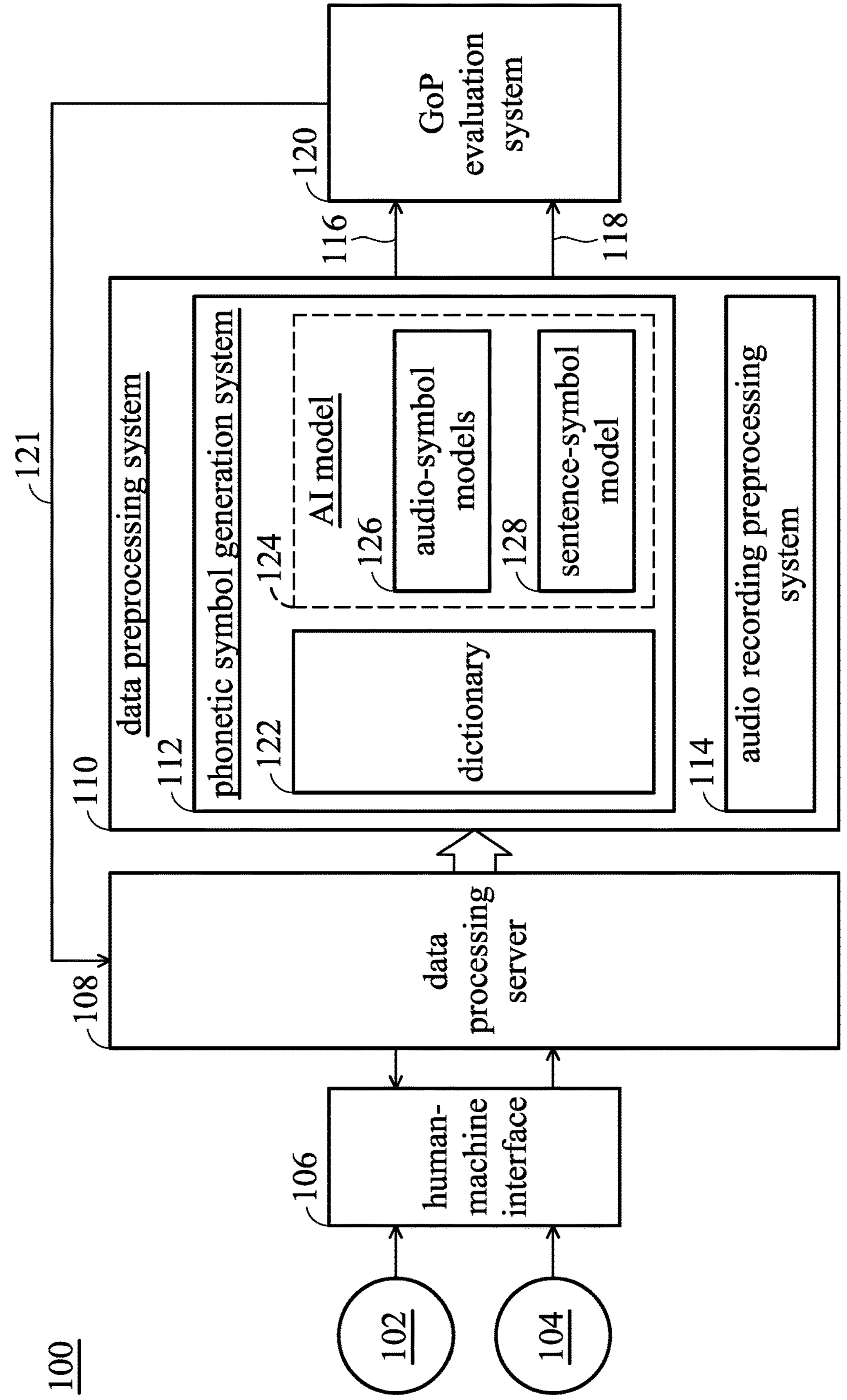
FIG. 1 illustrates a speaking practice system 100 for language learning.

FIG. 1 illustrates a speaking practice system 100 for language learning. A human-computer interface such as an application/webpage 106 may run on a client device (e.g., a mobile phone, a tablet, or a personal computer). Through the application/webpage 106, a user may select a practice text 102 to read out and make a recording to generate audio recording 104. The practice text 102 and audio recording 104 may be uploaded to a data processing server 108 via the application/webpage 106 to be preprocessed by a data preprocessing system 110 running on the data processing server 108. The data preprocessing system 110 includes a phonetic symbol generation system 112 and an audio recording preprocessing system 114. The phonetic symbol generation system 112 generates phonetic symbols 116. The audio recording preprocessing system 114 generates audio data 118 (e.g., a voice feature sequence, which is a digital data that may be processed by computers). The data processing server 108 further operates a Goodness of Pronunciation (GOP) evaluation system 120, which scores the audio recording 104 based on the phonetic symbols 116 and the audio data 118. The scoring result 121 is sent back to the client device by the data processing server 108 and is presented by the application/webpage 106 for the users to correct their pronunciations. The scoring result 121 may show the completeness, fluency, accuracy, etc. of the audio recording 104 relative to the practice text 102.

In an implementation, English pronunciations are distinguished by 39-dimensional phonemes. For details, please refer to the published article "Use of Speech Recognition in Computer-assisted Language Learning". The expected pronunciations of the practice text 102 may be represented by phonemes, i.e., the phonetic symbols 116 generated by the phonetic symbol generation system 112. The phonetic symbols 116 are the benchmark for the GOP evaluation system 120 to score the audio recording 104 and will significantly affect the reliability of the scoring.

For example, the text phoneme sequence converted from a practice text "You are my good friend" is:

[Y,UW1], [AA1,R], [M,AY1], [G,UH1,D], [F,R,EH1,N,D]

which is used as the phonetic symbols 116 and is sent to the GOP evaluation system 120 with the audio data 118 (converted from the audio recording 104) for scoring. The scoring result in units of phonemes may be:

[−8.263644,−9.056454], [−0.8452008,−6.122041], [−4.690601,−5.821236], [0,−2.156311,0], [−7.024531,−7.413582,−6.771776,−2.714007,−2.869504]

Based on a model corresponding to the text phoneme sequence, the GOP evaluation system 120 may forcibly align the audio data 118 with the text phoneme sequence that is used as the phonetic symbols 116, and then perform a posterior probability calculation for scoring. The larger the probability value is (for example, the closer the negative value is to zero), the higher the matching degree is matched. A score below a threshold is considered a pronunciation error. Such phoneme-level scoring may remind users in detail which phonetic symbols are mispronounced and whether the stress and unstressed sounds are correct. The reliability of scoring depends on whether the phonetic symbols 116 are correct. In an embodiment, if the phoneme-level score is less than −5, it is considered that the reading audio has a low degree of matching with the correct phonetic symbols, that is, the pronunciation is incorrect. The closer the phoneme level score is to 0, the more accurate the pronunciation is.

This disclosure provides a high-accuracy phonetic symbol generation system 112. In addition to operating with reference to a dictionary 122, the phonetic symbol generation system 112 operates an artificial intelligence (AI) model 124 to adapt the generated phonetic symbols 116 to various scenarios of polyphonic words. Based on the high-accuracy phonetic symbols 116, the GOP evaluation system 120 evaluates the audio recording 104 correctly.

Polyphonic words have various forms. Some are due to different parts of speech, and some are special words (such as numbers for different uses, or place names, etc.). A word may have different pronunciations due to its part of speech. For example, the noun and verb of the word "contract" are different in pronunciation and pronunciation stress. As querying the dictionary 122 for the word "contract", two phoneme sequences (with numbers 0-2 as stress marks) are obtained, including: "K AH0 N T R AE1 K T"; and "K AA1 N T R AE2 K T". Different from a traditional phonetic symbol generation system that selects the first phoneme sequence as the default phonetic symbols for scoring reference, the artificial intelligence model 124 provides an phoneme symbols confirming to a practical text or the environment the user is under practices as the phonetic symbols 116.

Taking numbers as the first example, they may present dates or phone numbers, and each corresponds to a special Chinese pronunciation. Take a phone number as an example. The emergency number "110" is usually pronounced as [yao yao ling] in Chinese rather than [yi yi ling]. Take dates as the second example. "January" is customarily pronounced as [yi yue] in Chinese rather than [yao yue]. "February" is customarily pronounced as [er yue] in Chinese rather than

[liang yue]. Take money as the last example, "2 dollars" is usually pronounced as [liang yuan] in Chinese rather than [er yuan]. According to the different uses of the numbers, the artificial intelligence model 124 adaptively provides a suitable phoneme sequence as the phonetic symbols 116 for scoring.

In another example, a special word may be a place name that requires a special pronunciation. Such special place names are one kind of polyphonic words.

In an embodiment, a practice text in Chine vfse is: "我喜歡都(du)市生活， 生 活便利， 機會較多， 比如上海， 成都(du)等都(dou)是比較好的大都(du)市". In English, it means "I love to live in a metropolitan city such as ShangHai and ChengDu, because life functions are good and there are more opportunities than others." Two pronunciations, [du] and [dou], for the same Chinese word "都" are used in the practice text. The conventional approaches may refer the default pronunciation [dou] from dictionaries, such that the user may read the practice text with the pronunciation [du], which is correct but is erroneously regarded as a pronunciation error conventionally. The artificial intelligence model 124 in the embodiment, however, may provide a suitable phoneme sequence as the phonetic symbols 116 for such a speaking practice text.

In the embodiment, the artificial intelligence model 124 designs a plurality of audio-symbol models 126 for word texts and a sentence-symbol model 128 for sentence texts, wherein different audio-symbol models 126 correspond to the different polyphonic words.

First, the plurality of audio-symbol models 126 designed for word texts is introduced. Each polyphonic word corresponds to a special audio-symbol model, and all the audio-symbol models associated with polyphonic words are integrated to implement the audio-symbol models 126.

Because there is no context is available for a text word to determine its part of speech, the word text itself provides no clue about its ideal pronunciation. In the disclosure, the audio-symbol models 216 corresponding to the word text refers to the user's audio recording 104 to determine the phonetic symbols 116 meeting the practice goal for users. In the embodiment, the phoneme sequence with the highest confidence value associated with the audio recording 104 when the user reads the word text (am I right?) is selected to form the phonetic symbols 116 of the polyphonic word. Therefore, the accuracy of phonetic symbol generation is improved and the pronunciation scoring is reliable. For example, corresponding to a Chinese city "成都 (Chengdu)", the default phonetic symbol of "都" from the dictionary is [dou] rather than [du]. However, according to the confidence value evaluated in this disclosure, the high confidence phoneme sequence related to the pronunciation of the city "成都 (Chengdu)" is [cheng du]. When the user pronounces [cheng du] correctly, the disclosed system gives it a high score without regarding it as a pronunciation error.

For a polyphonic word, user's audio recording 104 is input to corresponding audio-symbol model and the phonetic symbols 116 (predicted from the audio recording 104) is output according to the training purpose for the user. Taking one-word text "contract" as an example (which is a polyphonic word, whose noun pronunciation is/ʻ kɑːntrækt /, and verb pronunciation is /kənˈtrækt /), The word text "contract" in the embodiment of using the audio-symbol model Based on the audio recording 104 that the user practices the pronunciation when "contract" is a noun, the audio-symbol models 126 selects the text phoneme sequence "contract the noun" as the phonetic symbols 116 when the word text "contract" is a noun, because the higher confidence value indicates "contract" as a noun now. In this way, the score given to the user under practicing the pronunciation of "contract the noun" is based on the ideal pronunciation when "contract" is a noun, such that users may adjust their pronunciations during practices. Another example is a one-word text "wind" (with several noun pronunciations, including /wind/, and /waind/). By a traditional query of a dictionary, the obtained phonetic symbols may not meet the user's practices. However, in the embodiment, the phonetic symbols with the higher confidence value matching the user's practices are selected as the phonetic symbols 116 because the audio-symbol models 126 is able to improve accuracy in scoring user's pronunciations than the conventional.

The following introduces the sentence-symbol model 128 designed for sentence texts.

A sentence may have several polyphonic words (including polyphonic words due to different parts of speech, or polyphonic words with special characters such as numbers). In a sentence, the part of speech of the polyphonic word may be determined according to the context or the usage related to this polyphonic word, such that the ideal pronunciation may be deduced accordingly. This disclosure uses a Recurrent Neural Network (RNN) having memory functions, e.g., Long Short-Term Memory (LSTM) networks, in the sentence-symbol model 128. A sentence text (102) is input to the sentence-symbol model 128, which then outputs the phonetic symbols 116 about the sentence text (102) by taking into account the appropriate pronunciations of the polyphonic words in the sentence text.

The various implementations of the artificial intelligence models (126, 128) are described in more detail below.

First, the implementation of each audio-symbol model in 126 is introduced.

Figure 2:
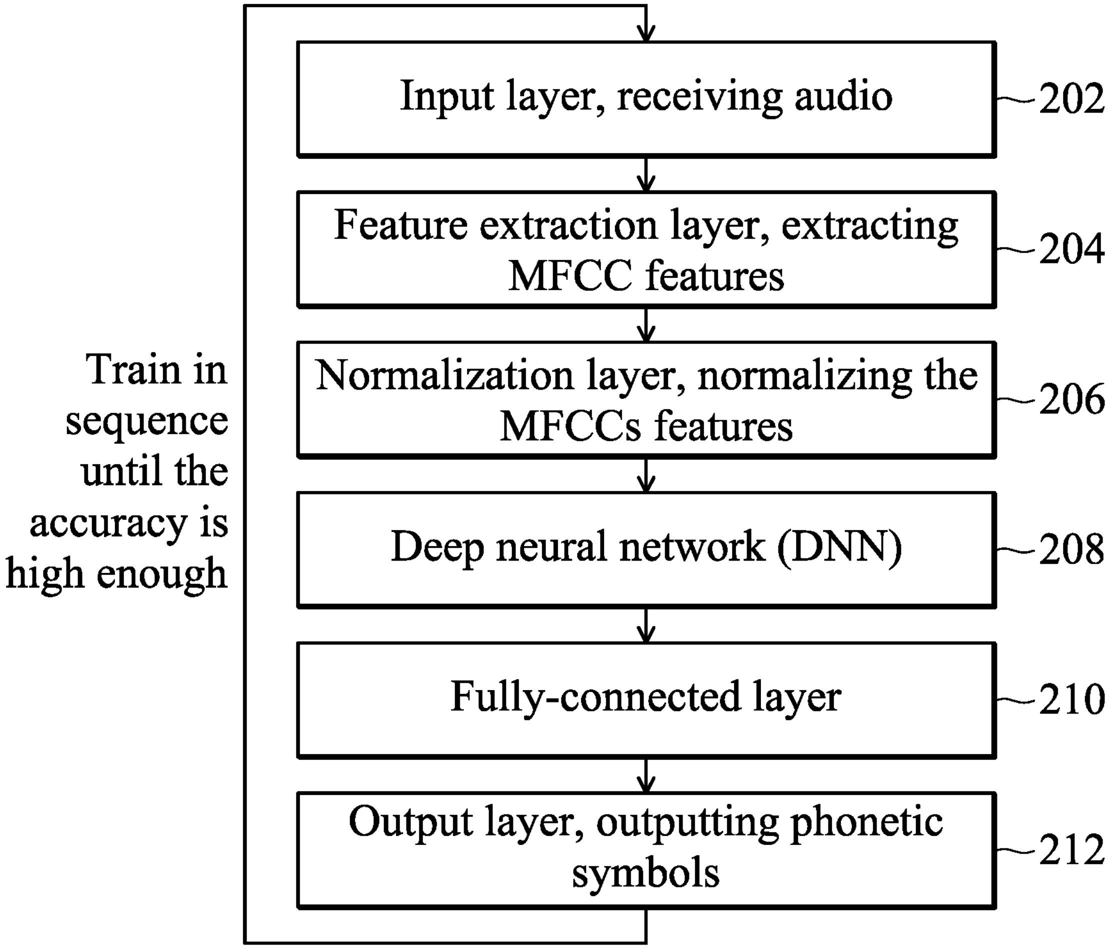
FIG. 2 is a block diagram illustrating the architecture of the audio-symbol model that is provided for a specific polyphonic word.

FIG. 2 is a block diagram illustrating the architecture of the audio-symbol models 216 that is provided for a specific polyphonic word. Block 202 shows the input layer. In the training phase, the audio of all possible standard pronunciations of the specific word is entered through the input layer 202. After the model is established, the user's audio recording 104 is entered through the input layer 202. Block 204 shows a feature extraction layer that is provided for audio feature extraction, e.g., for extraction of Mel-Frequency Cepstral Coefficients (MFCCs). Block 206 is a normalization layer, which normalizes the MFCCs features. Block 208 is a deep neural network (DNN). Block 210 is a fully-connected layer. Block 212 is the output layer. During the training phase, the outputs of the output layer (212) are compared with the expected phonetic symbols of the standard pronunciations to train the network parameters. After the training is completed, the output of the output layer (212) shows the proper phonetic symbols 116 that match the user's audio recording 104.

In an embodiment, a polyphonic word corresponds to three possible sequences of phonetic symbols: sequence A; sequence B; and sequence C. In response to the audio recording 104 that the user reads the polyphonic word for practice, the audio-symbol models 216 corresponding to this polyphonic word works to calculate the confidence values of the three possible sequences A, B, and C. The sequence with the highest confidence value is selected to form the phonetic symbols 116 according to user's practices.

Take Chinese language training as examples. The Chinese word "解" has difference pronunciations in the difference phrases: "渾身解(xie, the entering tone)數"; "解(jie, the departing tone)除"; "解(jie, the entering tone)送". The Chinese word "參" has difference pronunciations in the difference phrases: "参 (can, the level tone) 加 "; "人参 (shen, the level tone)"; "参 (cen, the level tone)差不齊 ". In response to such a Chinese text including a polyphonic word, the corresponding audio-symbol models 216 outputs the phonetic symbols 116 that has the highest confidence value when scoring the user's audio recording 104, which is the same as that when scoring the word text "contract" aforementioned.

The implementation of the sentence-symbol model 128 is described in more detail below.

Figure 3:
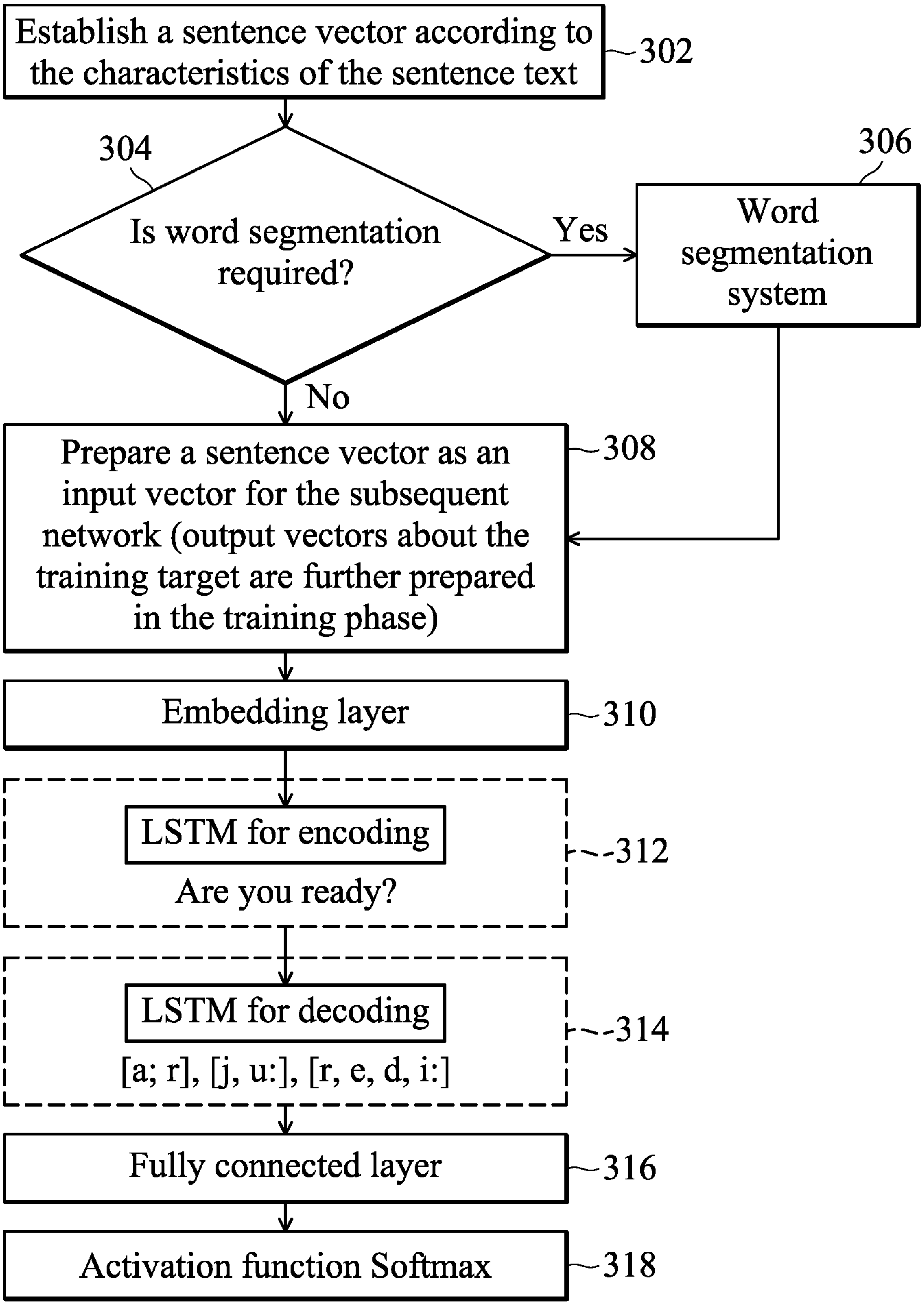
FIG. 3 is a block diagram illustrating the implementation architecture of the sentence-symbol model 128.

FIG. 3 is a block diagram illustrating the implementation architecture of the sentence-symbol model 128. A sentence text is first processed with blocks 302~308. In block 302, a sentence vector is established according to the characteristics of the sentence text. In block 304, it is determined whether word segmentation is required. For example, word segmentation is required for a Chinese sentence, but is not required in an English sentence. Block 306 is a word segmentation system, which responds to word segmentation requirements and segments the sentence vector into words. In block 308, the sentence vector is prepared as an input vector for the subsequent network. In the training phase, output vectors about the training target (e.g. expected phonetic symbols of the training texts, wherein the training texts are various sentences that each includes polyphonic words) are further prepared in block 308. If the model is specifically built for a language that do not require word segmentation, the word segmentation judgment of block 304 and the word segmentation system 306 may be deleted.

From a linguistic point of view, a word is the smallest unit having its own meaning in semantics or pragmatics such that human beings may say it independently. For example, the Chinese word "人 (human)" may be independently understood in semantics or pragmatics. The word itself represents "animals that evolved from apes and may make and use tools for work, and may communicate using language." A word may be realized as the smallest unit with literal meaning that a human being may express alone, and there is no literal or actual meaning anymore if the word is further subdivided. This rule is also adapted to English. For example, the English word "Walk" basically means to walk. An English word is the smallest unit that may be understood without being combined with the other words. It expresses a unit that defines "practical meaning" in English linguistics (actual meaning, which may also be understood as action meaning).

In Chinese, "汽車 (car)" contains two Chinese characters (i.e., "汽 " and "車 "), but they are now combined as a single word having a special meaning. In this example, "汽 (vaper)" and "車 (vehicle)" are characters and may not be realized separately because any individual meanings of them may be unrelated to "汽車 (car). Another Chinese term "火車 (train)" contains two Chinese words (i.e., "火 " and "車 "), but they are now combined as a single word having a special meaning. In this example, "火 (fire)" and "車 (vehicle)" are characters and may not be realized separately because any individual meanings of them may be unrelated to "火車 (train). This rule is also adapted to English. vehicle" may not be split into the letters "v", "e", "h", "i", "c", "l", and "e", and "train" may not be split into the letters "t", "r", "a", "i" and "n". Usually, words in Chinese may be composed of one or more single Chinese characters. Thus, a word segmentation system (306) is required in Chinese learning system, but the word segmentation is generally not required in English words.

Word segmentation is required for the correct understanding of a sentence. Different segmentation results may show the different meanings. Although the basic expression unit of modern Chinese is "term" (mostly two-character or multi-character words, such as "汽車 (car)" "火車 (train)"), it is difficult to distinguish the boundaries between Chinese words and phrases because every Chinese may have his/her own idiomatic grammar slight different with others. Different word segmentations may result in different meaning as shown in the following example ("乒乓球拍賣完了 "). The subject may be "乒 乓球 (ping-pong ball)" if the segmented Chinese sentence is "乒乓球 (ping-pong ball)/ 拍賣 (auction)/ 完了 (out)", and the subject may be "乒乓球拍 (ping-pong racket)" if the segmented Chinese sentence, "乒乓 (ping-pong)/ 球拍 (racket)/ 賣 (sold)/ 完了 (out)".". Therefore, the word segmentation system 306 is necessary for overcoming the above disadvantages in Chinese.

Chinese word segmentation examples are further discussed here. A Chinese text "小盛看到湖岸 上的花草 , —株不知名的小花 引起了他的注意 (Xiao Sheng saw the flowers and plants on the lake shore, and his attention was then caught by an unknown little flower.)" may have several word segmentation results, such as: "小盛看到湖岸 花 車 /, —株不知名的小花 花/引起/了/他的/注意 (attention)" (which will be correctly understood as "Xiao Sheng/ saw/ the flowers and plants on the lake shore/, and an/ unknown/ little flower/ caught/ his/ attention), or "小盛 (Xiao Sheng) /看到 (saw)/湖 (lake)/岸 (shore) /上 (on)的/花 (flowers) /草 (plants), —株 (a)/不 (no)知名 (name)/的/小花 (little flower) /引起了 (caught)/他的 (his)/注意 (attention)"; or "小盛 (Xiao Sheng)/看到 (saw) /湖岸 (lakeshore)/上 的 (on)/花 (flowers) /草 (plants), 一株 (an) /不知名的 (unknown)/小花 (little flower) /引起了 (caught) /他的 (his)/注意 (attention)." Through the different segmentations, the same Chinese sentences will result in the different meanings. In addition, some special words such as place names also require appropriate segmentations.

Block 310 is an embedding layer. Blocks 312 and 314 are long short-term memory (LSTM) networks. The LSTM network of block 312 may temporarily stores the context of the processing words and is used as an encoder. The LSTM network of block 314 also temporarily stores the context of the processing word and is used as a decoder. The illustrated architecture simulates a seq2seq model, but is faster than a seq2seq layer and more accurate than a simple LSTM network. Through a fully connected layer 316 and an activation function 318, the LSTM network encoding and decoding results from blocks 312 and 314 are output as the phonetic symbols 116 for scoring. A normalized exponential function Softmax may be used to implement the activation function provided by the block 318.

The sentence-symbol model 128 not only memorizes the context in a single sentence (e.g., the previous word, the word before the previous word, the next word, and the word after the next word, with respect to the target word), but also has the capability to remember the context of the processing sentence. In this way, polyphonic words in plural sentences may be effectively predicted, too.

Figure 4:
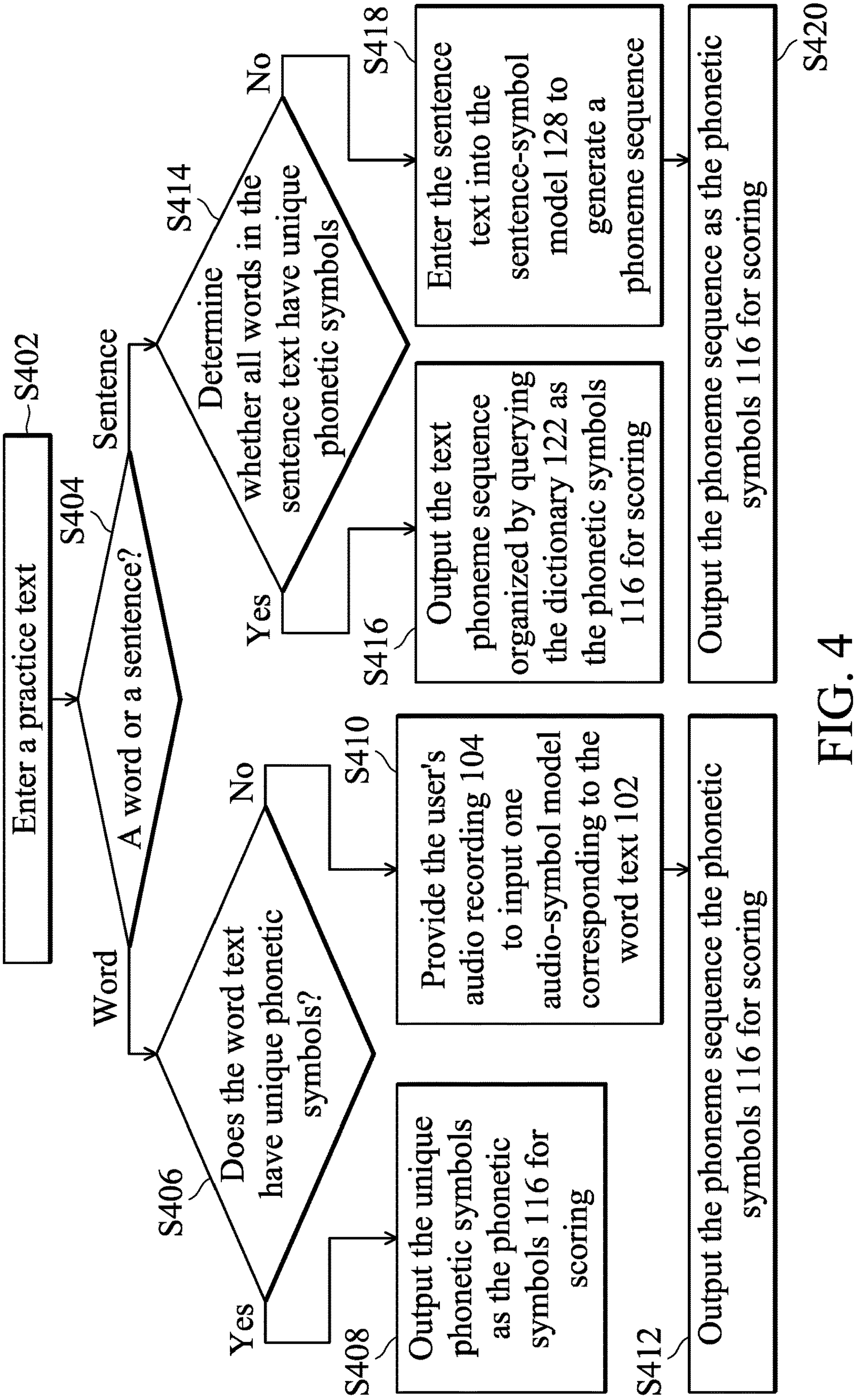
FIG. 4 illustrates the workflow of the phonetic symbol generation system 112 in accordance with an embodiment of the disclosure.

FIG. 4 illustrates the workflow of the phonetic symbol generation system 112 in accordance with an embodiment of the disclosure. In step S402, a practice text 102 is entered. In step S404, it is determined whether the practice text 102 is a word or a sentence. If it is a word, the process goes to step S406 to query the dictionary 122 (or make some additional considerations) to determine whether the word text has unique phonetic symbols. If so, the process proceeds to step S408 to output the unique phonetic symbols as the phonetic symbols 116 for scoring. In the design, special words (such as numbers and dates) and the words having several pronunciations listed in the dictionary 122 (due to their part of speech) are regarded as polyphonic words without unique phonetic symbols.

If there are several possible pronunciations for one word text, the process proceeds to step 410 to input the user's audio recording 104 into the audio-symbol models 126 corresponding to the word text 102. A phoneme sequence close to the audio recording 104 is output by the audio-symbol model, and then, in step S412, the phoneme sequence is output as the phonetic symbols 116 for scoring in step S412.

If it is determined in step S404 that the practice text is a sentence text, the process proceeds to step S414 to query the dictionary 122 to determine whether all words in the sentence text have unique phonetic symbols. If so, the process proceeds to step S416 to output the text phoneme sequence organized by querying the dictionary 122 as the phonetic symbols 116 for scoring.

If any word in the sentence text has the other possible pronunciation, the process proceeds to step S418 to enter the sentence text into the sentence-symbol model 128 to generate a phoneme sequence, and then step S420 outputs the phoneme sequence as the phonetic symbols 116 for scoring.

Taking the Chinese text "我喜歡都 (du) 市生活， 生活便利，機會較多，比如 上海， 成都 (du) 等都 (dou) 是比較好的大都 (du) 市 ; with translation: I love to live in a metropolitan city such as ShangHai and ChengDu, because life functions are good and there are more opportunities than others." as an embodiment, after the steps S418 and S420, "ChengdDu" may be correctly determined as a city and the generated phonetic symbols 116, "Chengdu (du)", for scoring are correct.

In an embodiment, the GOP evaluation system 120 uses a language model and an acoustic model, which forcibly aligns the audio data 118 with the text phoneme sequence, and calculates the posterior probability of a possible phoneme state sequence generated by the alignment. The phonetic symbol generation system 112 with the artificial intelligence model 124 may also help establish the language model and acoustic models used in the GOP evaluation system 120.

Figure 5:
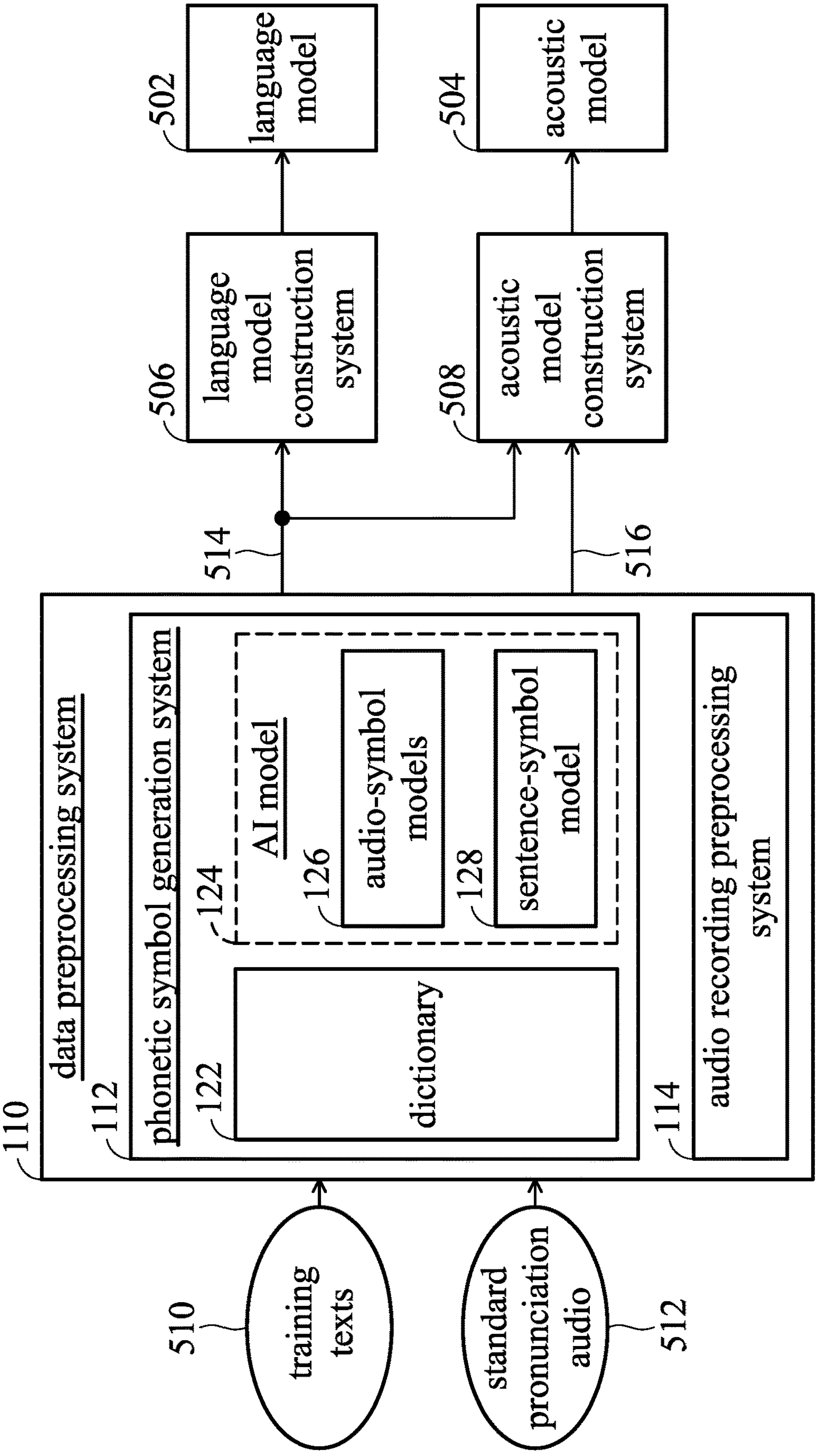
FIG. 5 illustrates a method of establishing a language model 502 and an acoustic model 504.

FIG. 5 illustrates a method of establishing a language model 502 and an acoustic model 504. Training of the language model 502 requires a language model construction system 506. Training of the acoustic model 504 requires an acoustic model construction system 508. A series of training texts 510 and their standard pronunciation audio 512 are input into the aforementioned data preprocessing system 110, to be converted into training phonetic symbols 514 and training audio data 516 by the phonetic symbol generation system 112 (including the artificial intelligence model 124) and the audio recording preprocessing system 114. The language model construction system 506 trains the language model 502 based on the training phonetic symbols 514. The acoustic model construction system 508 trains the acoustic model 504 based on the training phonetic symbols 514 as well as the training audio data 516. Under this design, the language model 502 may be well-trained by the language model construction system 506 based on the high-accuracy training phonetic symbols 514. Similarly, the acoustic model 504 the acoustic model may be well-trained to have better acoustic simulation effects by the construction system 508 based on the high-accuracy training phonetic symbols 514.

Figure 6:
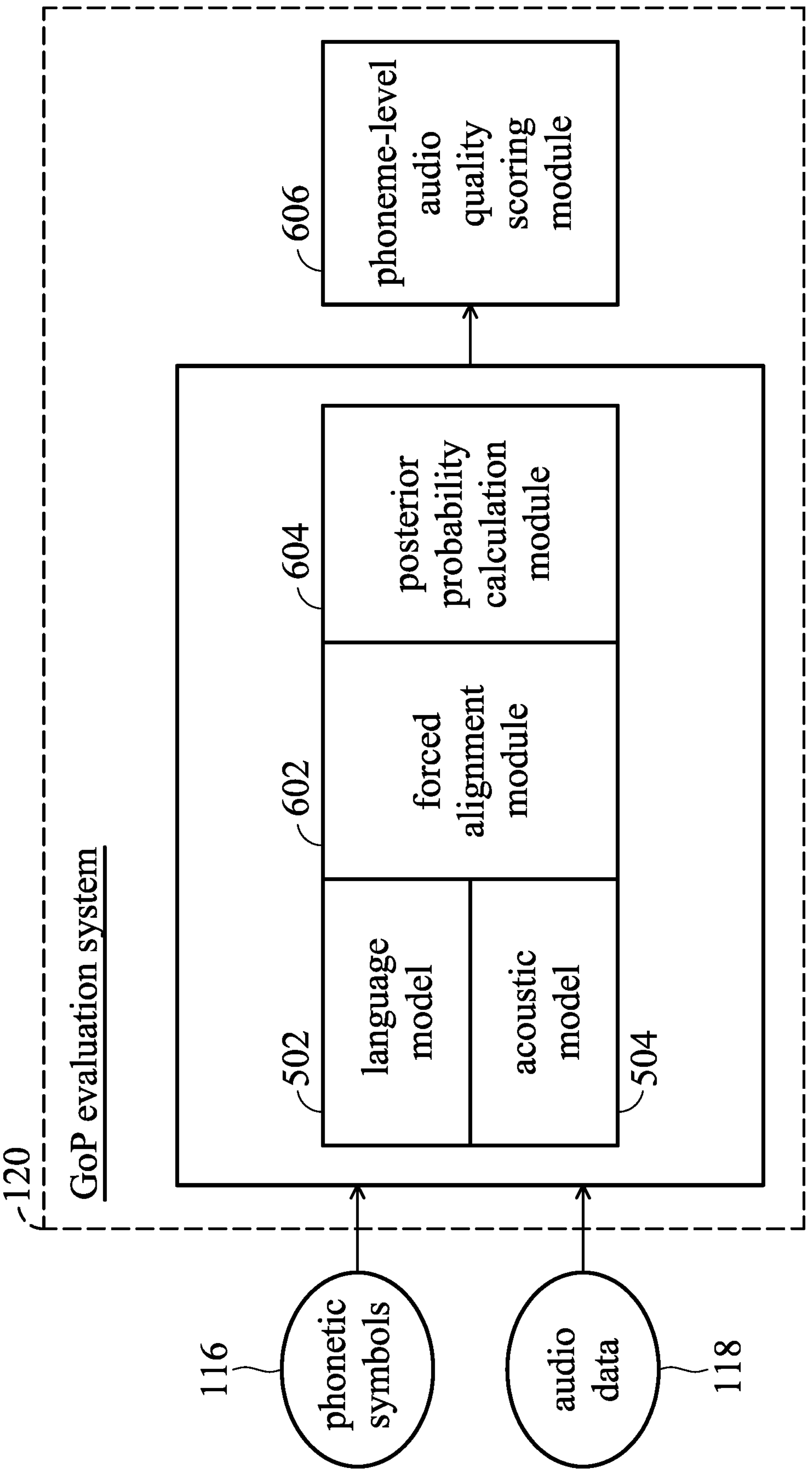
FIG. 6 illustrates the GOP evaluation system 120 in accordance with an embodiment of the disclosure, which includes the language model 502 and the acoustic model 504 trained in FIG. 5.

FIG. 6 illustrates the GOP evaluation system 120 in accordance with an embodiment of the disclosure, which includes the language model 502 and the acoustic model 504 trained in FIG. 5, and according to the phonetic symbols 116 and the audio data 118. The GOP evaluation system 120 further includes a forced alignment module 602, a posterior probability calculation module 604, and a phoneme-level audio quality scoring module 606. The phoneme-level audio quality scoring module 606 corrects the user's pronunciation phoneme-by-phoneme. In another embodiment, word-level or sentence-level audio quality scoring module is provided, to correct the user's pronunciation word-by-word, or sentence-by-sentence.

In addition, in Chinese training, in addition to the word segmentation design in FIG. 3, the dictionary 122 also needs to be replaced with a term-symbol translation module. Such a term-symbol translation module can be developed by the service provider itself, or it can be a Chinese dictionary publicly available on the consumer market. Such a term-symbol translation module may be developed by the service provider or a Chinese dictionary publicly available on the consumer market (which may established by means of NLP (Natural Language Processing) databases).

When the user reads a polyphonic word (or a special word) or a sentence including any polyphonic words (or with any special words) and gets a low score in the pronunciation of the polyphonic word (or the special word), the intelligent server may present all pronunciations and explanations about the polyphonic word (which may be obtained from the system database or searched for on the Internet) to the user through a human-machine interface such as an application or a web page 106.

In some embodiments, the artificial intelligence model 124 may not include the sentence-symbol model 128 and may only use the plurality of audio-symbol models 126 to process polyphonic words of word texts. Any implementation under the spirits of the disclosure falls within the scope of the appended claims.

In some embodiments, the artificial intelligence model 124 may not include the plurality of audio-symbol models 126 and may only use the sentence-symbol model 128 to process sentence texts that include polyphonic words. Any implementation under the spirits of the disclosure falls within the scope of the appended claims.

Any technology that designs an artificial intelligence model in a phonetic symbol generation system to generate phonetic symbols in response to a practice text that includes a polyphonic word (for example, a word that the dictionary 122 alone may not accurately provide its phonetic symbols) falls within the scope of protection of the disclosure. The design details of the artificial intelligence model may also have many variations, which should all fall within the scope of the disclosure.

The aforementioned various systems running on the data processing server 108 include software and hardware design, which involves software running by high-speed computing hardware.

In addition to adding audio-symbol or sentence-symbol models on the cloud to improve the speech recognition accuracy of the model, this disclosure also makes further improvement at the client end. In an embodiment, after the system recognizes the speech errors made by the user, the system further clearly points out the errors of the user's reading at the client end.

For a practice text, the user's reading may have the following situations: a) Normal reading, each word is read-out according to the requirements of the practice text; b) Missing words; c) Reading additional words not contained in the practice text; d) There is noise around; e) Reading redundant phonetic symbols not contained in a word, for example, erroneously pronounce "good" as "goodness"; and f) Missing phonetic symbols, for example, erroneously pronounce “goodness” as “good”.

This disclosure proposes a high-reliability scoring technology for the redundant pronunciation cases such as c) and e). This disclosure also proposes a solution to environmental noise such as d).

Figure 7:
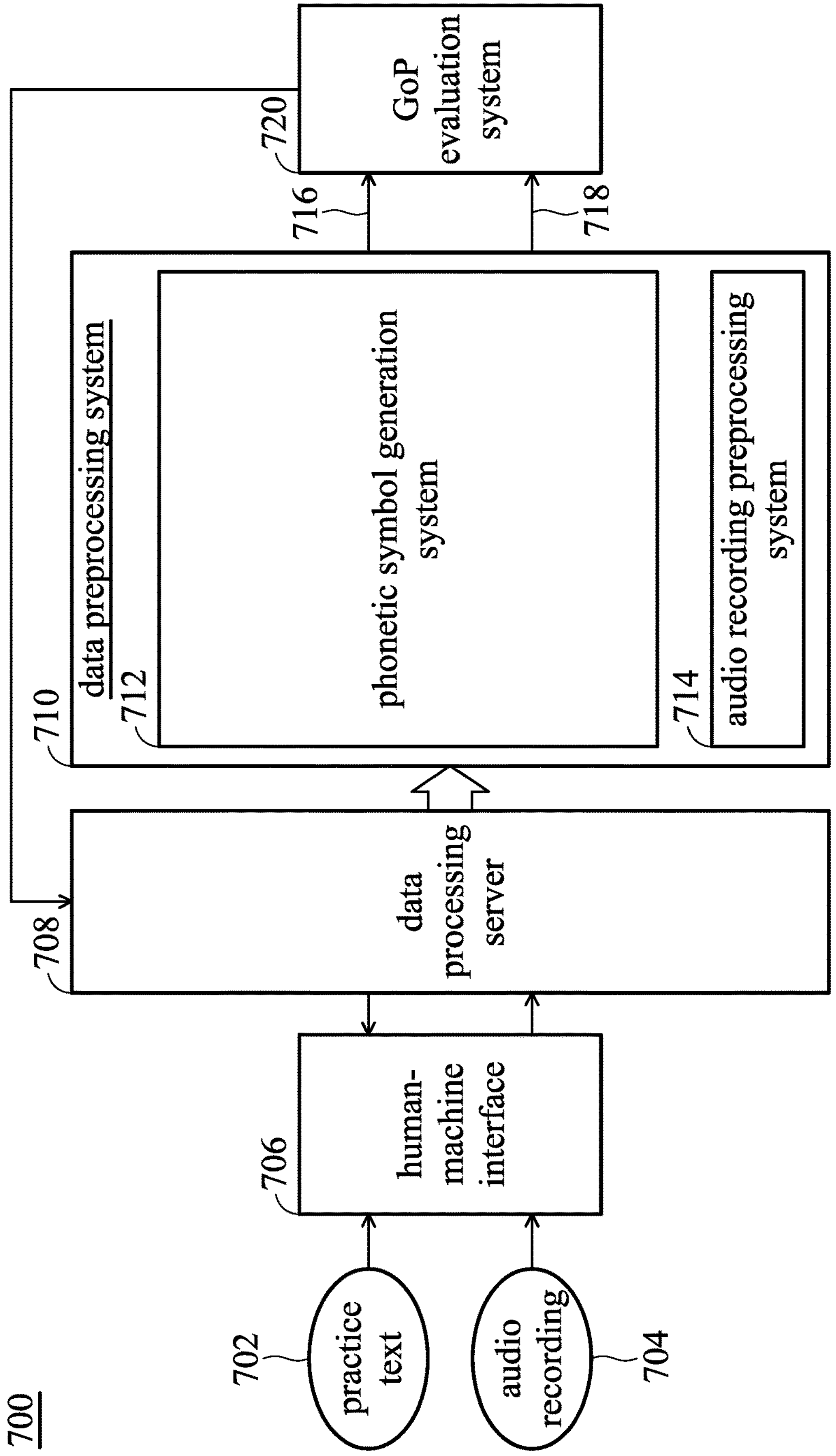
FIG. 7 illustrates a speaking training system 700 for language learning in accordance with an embodiment of the disclosure.

FIG. 7 illustrates a speaking training system 700 for language learning in accordance with an embodiment of the disclosure. The user may read out a prepared practice text which is then recorded as the recording 704. Practically, the user may select the practice text 702 from a human-machine interface, such as an application/webpage 706 running on a client device (e.g., a mobile phone, a tablet, or a personal computer), for reading out and recording and may thereby generate the audio recording 704. The practice text 702 and audio recording 704 may be uploaded to a data processing server 708 through the application/webpage 706 to be further processed by a data preprocessing system 710 running on the data processing server 708. The data preprocessing system 710 includes a phonetic symbol generation system 712 and an audio recording preprocessing system 714, which generates phonetic symbols 716 and audio data (digital signals, such as voice feature sequences, that may be processed by a computer) 718, respectively. The data processing server 708 further runs a GOP evaluation system 720, which scores the audio recording 704 based on the phonetic symbols 716 and the audio data 718. The data processing server 708 sends the scoring results back to client’s end to be displayed via the application/webpage 706, such that the user may refer to the information shown thereon to correct his/her pronunciations. The scoring may show the completeness, fluency, accuracy, etc. of the audio recording 704 relative to the practice text 702.

In particular, the GOP evaluation system 720 has a redundant pronunciation correction function, which finds out the redundant pronunciations from the user’s recording.

Generally, with respect to the redundant pronunciations in the user’s audio recording 704, no scoring reference may be found in the phonetic symbols 716 of the ideal pronunciations of the practice text 702. Traditional approaches treat these redundant pronunciations as invalid/silent frames (no matched phonetic symbols for scoring) since they are incapable of recognizing user’s redundant pronunciations and treat them as meaningless contents.

In an example, the practice text is “good”. If the user pronounces it as “goodness”, the pronunciations of “ness” are redundant. In another example, the practice text is “Good morning.” If the user reads it as “Good morning, Marry”, the pronunciations of “Marry” are redundant. In traditional technology, the redundant pronunciations of “ness” or “Marry” will be treated as meaningless contents or noise because there is no phonetic symbol reference corresponding to the redundant pronunciations. The traditional GOP evaluation system does not have the capability to recognize/notify user’s redundant pronunciations “ness” and “Marry” aforementioned. In comparison, the disclosed GOP evaluation system 720 is capable of redundant pronunciation correction, which will detect the redundant pronunciations of “ness” or “Marry” and correctly notify the user to correct his redundant pronunciations.

Figure 8:
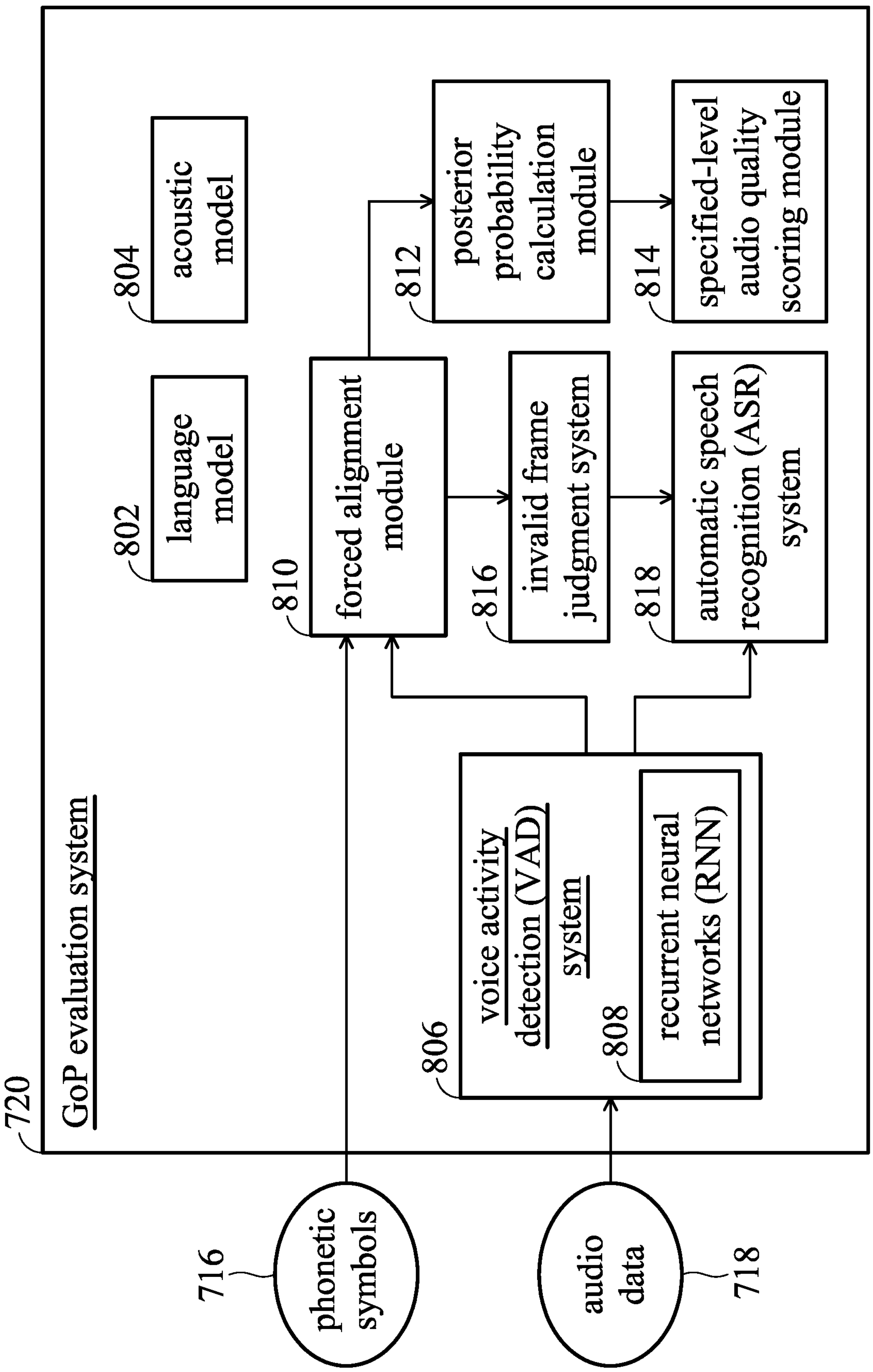
FIG. 8 illustrates an embodiment of the GOP evaluation system 720 that is capable of redundant pronunciation correction.

FIG. 8 illustrates an embodiment of the GOP evaluation system 720 that is capable of redundant pronunciation correction, which includes a language model 802 and an acoustic model 804 for analysis of the phonetic symbols 716 and the audio data 718.

The evaluation GOP system 720 capable of redundant pronunciation correction may operate a voice activity detection (VAD) system 806, which filters noise and obtain effective human voice by means of recurrent neural networks (RNN) 808 of deep learning. In the training phase, the RNN 808 takes human voice recorded in various noisy environments as input, and outputs pure audios obtained from the recorded human voices as the training target. In an embodiment, the training data is collected in a specific environment, such as a classroom, so that the RNN 808 may accurately filter out the classroom noise. The environmental noise in situation d) is thus properly resolved.

The GOP evaluation system 720 capable of redundant pronunciation correction may further operate a forced alignment system 810. After the noise filtering, the audio data 718 is forcibly aligned to the phonetic symbols 716 that include the text phoneme sequence of the practice text 702. In this example, the forced alignment system 810 operates based on the language model 802 and the acoustic model 804 to map the frames of the audio data 718 to the text phoneme sequence (716). The number of audio frames corresponding to each phoneme may be calculated based on the acoustic model 804. In an embodiment, the forced alignment system 810 queries the acoustic model 804 for the phoneme models of the different phonemes appear in the phonetic symbols 716. Through these phoneme models, it is determined each frame of the audio data 718 maps to which phoneme in the phonetic symbols 716, and what state the mapped phoneme is.

Taking the CMU pronunciation dictionary as an example, for each phoneme, there may be three accent marks: 0 represents none stress; 1 represents primary stress; and 2 represents the secondary stress. Each phoneme is further marked as the beginning (B), middle (I), or end (E) of the word, or as a single-phonetic word (S). For example, the representative numbers representing the various states (containing information about the phonetic symbols, stress, and word position) of the phoneme “IY” are as follows:

IY0_B 203
IY0_E 204
IY0_I 205
IY0_S 206
IY1_B 207
IY1_E 208
IY1_I 209
IY1_S 210
IY2_B 211
IY2_E 212
IY2_I 213
IY2_S 214

In addition, the beginning of a sentence may be marked by number “0”, silence may be represented by “SIL”, and words not supported in the dictionary (known as OOV) may be represented by “SPN”.

The forced alignment system 810 is discussed as follows. The forcibly aligned result of the practice text “make you sweet” and the user’s audio recording “make you sweet, I like cake” may be:

“1 1 1 1 1 1 1 1 227 227 227 227 165 165 165 165 165 165 165 165 165 165 220 220 220 220 220 220 220 220 220 220 220 1 1 1 1 1 1 1 1 1 1 1 1 1 335 335 335 335 335 335 335 335 335 335 335 335 335 335 335 335 335 335 335 335 335 335 335 335 335 335 335 320 320 320 320 320 320 320 320 320 320 320 320 320 320 320 279 279 279 279 279 279 279 279 279 279 279 333 333 333 333 333 333 333 333 333 333 333 209 209 209 209 209 209 209 209 209 209 209 209 209 288 288 288 288 288 288 288 288 288 288 288 288 288 288 288 288 288 288 288 288 288 1 1 1 1 1 1 1 1 1 1 1 1 1 1 1 1 1 1 1 1 1 1 1 1 1

1 1 1 1 1 1 1 1 1 1 1 1 1 1 1 1 1 1 1 1 1 1 1 1 1 1 1
1 1 1 1 1 1 1 1 1 1 1 1 1 1 1 1 1 1 1 1 1 1 1 1 1 1 1
1 1 1 1 1 1 1 1 1 1 1 1 1 1 1 1 1 1 1 1 1 1 1 1 1 1 1
1 1 1 1 1 1 1 1 1 1 1 1 1 1 1 1 1 1 1 1 1 1 1 1 1 1 1
1 1 1 1 1 1 1 1 1 1 1 1 1 1 1 1 1 1 1 1 1 1 1 1 1 1 1
1 1 1 1 1 1 1 1 1 1 1 1 1 1 1 1 1 1 1 1 1 1 1 1 1 1 1
1 1 1 1 1 1 1 1 1 1 1 1 1 1 1 1 1 1 1 1 1 1 1”

Each number represents the phoneme corresponding to a frame.

After the forced alignment (810), “1” indicates an invalid frame because this frame maps none of phonetic symbols 716, and it is an invalid frame. The other numbers represent frames of pronunciation phonemes with scores. For example, in the forcibly aligned result of the aforementioned text “make you sweet” and the user’s audio recording “make you sweet, I like cake”, the first eight “1”s represent eight invalid frames, and the number “227” repeated four times shows four frames of “M_B” phoneme (the pronunciation of “M”). In the middle frames, the phoneme numbers are “165” . . . “288”, which include valid frames of the pronunciations with 14 invalid frames (“1”) mixed therein. At the end, the number “1” repeated 210 times represents 210 invalid frames.

The GOP evaluation system 720 operates a posterior probability calculation system 812 and a specified-level audio quality scoring system 814. In the forcibly aligned result, the valid frames are sent to the posterior probability calculation system 812 for posterior probability calculation and, accordingly, the specified-level audio quality scoring system 814 preforms phoneme-by-phoneme scoring, or word-by-word scoring, or sentence-by-sentence scoring.

The invalid frames (“1”) in the forcibly aligned result, they will be sent to an invalid frame judgment system 816 running on the GOP evaluation system 720 to determine whether the invalid frames correspond to redundant pronunciations.

The GOP evaluation system 720 may further operate an automatic speech recognition (ASR) system 818 for recognizing the contents of the redundant pronunciations. In response to the invalid frame judgment system 816 that obtains the redundant pronunciations, the ASR system 818 further recognizes the phonemes of the invalid frames, and then analyzes the contents of the redundant pronunciations.

A Chinese text for practice is: “我喜歡都 (du) 市生活，生活便利，機會較多， 機會較多， 成都 (du) 等都 (dou) 是比較好的大都 (du) 市 (I like the life in metropolitan cities, with convenient life and more opportunities. For example, metropolitan cities such as Shanghai and Chengdu are better metropolitan cities)”. In the user’s audio recording, it is: “ 我喜歡都 (du) 市生活節奏， 生活便利， 機會較多， 比如上海， 成都 (du) 等都 (dou) 是比較好的大都 (du) 市 (I like the pace of life in metropolitan cities, with convenient life and more opportunities. For example, metropolitan cities such as Shanghai and Chengdu are better metropolitan cities)”. The term “節奏 (pace)” is redundant, and is not contained in the practice text such that very low scores are given for the term “節奏 (pace)” in the sentence including the term “節奏 (pace)”. Through the ASR system 818, the low scored term “節奏 (pace)” is recognized. The user may know the redundant term is “節奏 (pace)”.

In an embodiment, a redundant pronunciation discrimination threshold is introduced. If the number of consecutive invalid frames (“1”) exceeds the redundant pronunciation discrimination threshold, the invalid frame judgment system 816 regards the consecutive invalid frames as redundant pronunciations. Otherwise, they are regarded as mute frames. The GOP evaluation system 720 operates the data processing server 708 to send a notification to the user via the human-machine interface implemented by the application/web page 706, to inform the user the redundant pronunciations.

In an embodiment, the specified-level audio quality scoring system 814 reflects the redundant pronunciations in the score, and intuitively uses the scores to make the user realize that his/her pronunciation is inaccurate or has redundant pronunciations.

In particular, the ASR system 818 converts the redundant frames into phonemes and recognizes them based on the acoustic model 804, without using the practice text as a reference. By operating the data processing server 708, the GOP system 720 returns the contents of the redundant pronunciations to the human-machine interface implemented as the application/web page 706, to directly notify the user which phonetic symbols/characters are redundant.

In an embodiment, the redundant pronunciation discrimination threshold is set to 15. In the forcibly aligned result, “1” that appears more than 15 times in a row does not represent mute frames. Instead, the invalid frame judgment system 816 determines the series of frames as redundant pronunciations. In addition, the number representing an invalid frame is not limited to “1”, and another specific number may be set by the manufacturer to represent an invalid frame.

In an embodiment, the redundant pronunciation discrimination threshold depends on the sampling rate of the audio recording 704.

In an embodiment, the redundant pronunciation discrimination threshold depends on the calculation algorithm adopted in the VAD system 806.

The redundant pronunciation discrimination threshold may depend on the recording environment or the sentence length. Reading a long sentence is more laborious, and the reader may pause for a longer time, so the redundant pronunciation discrimination threshold should be larger. On the contrary, the shorter sentence may correspond to a smaller redundant pronunciation discrimination threshold. The rigor of the scoring may be changed. A stricter scoring standard may use a smaller redundant pronunciation discrimination threshold.

In the aforementioned example, the forcibly aligned result of the practice text “make you sweet” and the user’s audio recording “make you sweet, I like cake” includes a long string of invalid frames (“1” repeats 320 times) at the end and may trigger the following operations. The invalid frame judgment system 816 observes the consecutive 210 “1”s, and determines that the number of the consecutive “1”s is much more than the redundant pronunciation discrimination threshold (15). Thus, the invalid frame judgment system 816 determines that these frames are redundant pronunciations rather than mute frames. The ASR system 818 operates. Based on the acoustic model 804, these 210 frames of audio data are converted into phonemes with the highest probability. The forcibly aligned result is further transformed as follows:

“1 1 1 1 1 1 1 1 227 227 227 227 165 165 165 165 165
165 165 165 165 165 220 220 220 220 220 220 220 220
220 220 220 1 1 1 1 1 1 1 1 1 1 1 1 1 1 335 335 335
335 335 335 335 335 335 335 335 335 335 335 335 335
335 335 335 335 335 335 335 335 335 320 320 320 320
320 320 320 320 320 320 320 320 320 320 320 279 279
279 279 279 279 279 279 279 279 279 333 333 333 333
333 333 333 333 333 333 333 209 209 209 209 209 209
209 209 209 209 209 209 209 288 288 288 288 288 288
288 288 288 288 288 288 288 288 288 288 288 288 288
288 288 102 102 102 102 102 102 102 102 102 102 102

102 102 102 102 102 102 102 102 102 102 102 102 102
102 102 102 102 223 223 223 223 223 223 223 223 223
223 223 223 223 223 223 223 101 101 101 101 101 101
101 101 101 101 101 101 101 101 101 101 220 220 220
220 220 220 220 220 220 220 220 220 220 220 220 220
220 219 219 219 219 219 219 219 219 219 219 219 219
219 219 219 219 165 165 165 165 165 165 165 165 165
220 220 220 220 220 220 220 220 220 220"

The first eight "1"s and the middle fourteen "1"s are mute frames because their number of consecutive "1"s are less than 15, which is the redundant pronunciation discrimination threshold. The original consecutive 210 "1"s at the end are converted into phonetic symbols "102" . . . "220" by the ASR system 818. Accordingly, it is recognized that the redundant pronunciations are "I like cake". By operating the data processing server 708, the GOP evaluation system 720 sends a notification to the human-machine interface implemented as the application/webpage 706, to inform the user of the redundant reading "I like cake", and the "I like cake" may use different color or size to conspicuous these redundant pronunciations.

Figure 9:
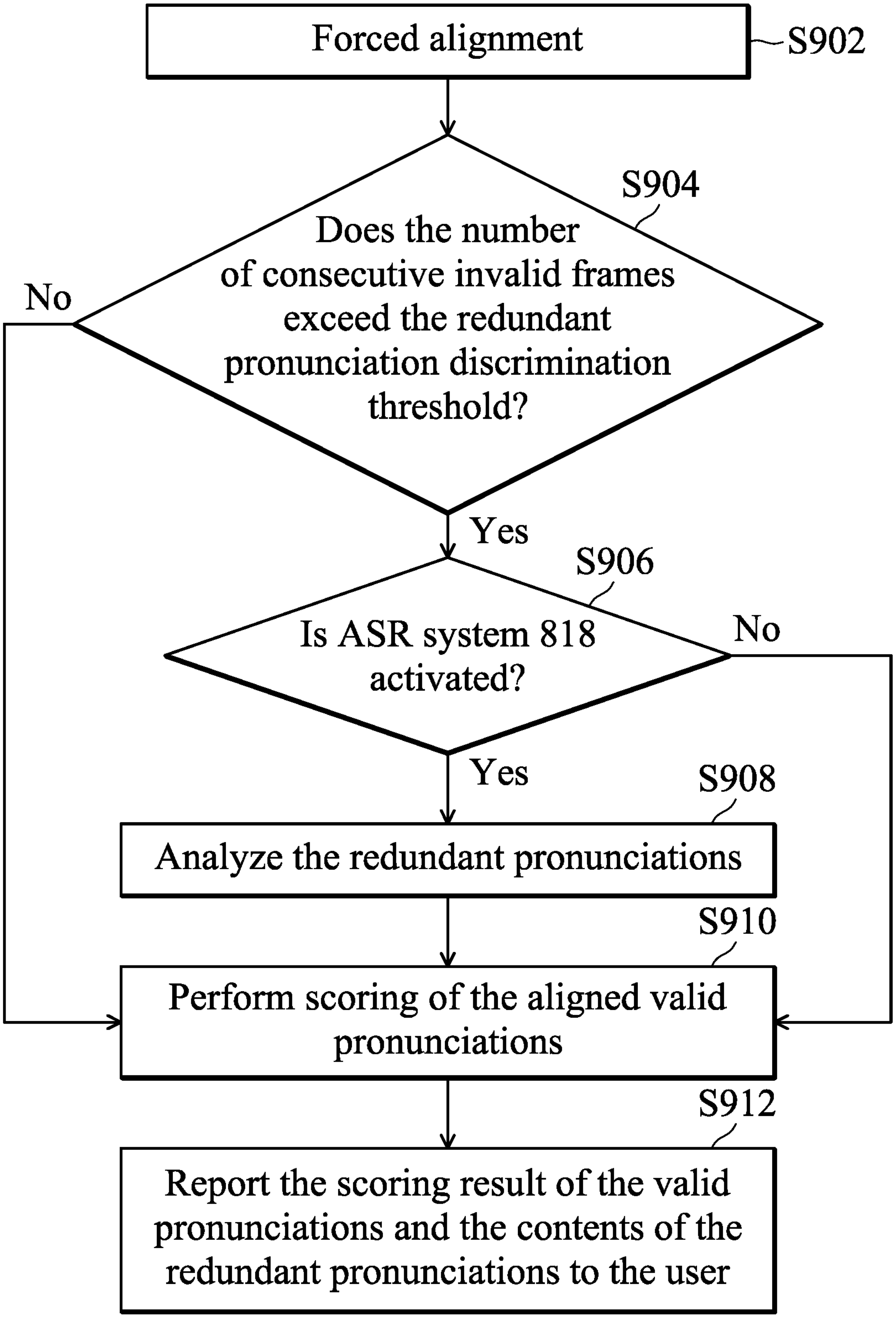
FIG. 9 is a flow chart depicting the operations of the GOP evaluation system 720.

FIG. 9 is a flow chart depicting the operations of the GOP evaluation system 720. In step S902, the audio data 718 is forcibly aligned to the phonetic symbols 716 of the practice text. In step S904, it is determined whether the number of consecutive invalid frames exceeds the redundant pronunciation discrimination threshold. If yes, the process proceeds to step S906 to determine whether the ASR system 818 is activated. If the system setting is to activate the ASR system 818, the process proceeds to step S908 to analyze the redundant pronunciations. In step S910, scoring of the aligned valid pronunciations is performed. In step S912, the scoring result of the valid pronunciations and the contents of the redundant pronunciations are reported to the user. Valid scoring for redundant pronunciations may reflect more use's pronunciation situations.

If the ASR system 818 is inactive, the process skips the step S908 and proceeds directly to step S910 to score the aligned valid pronunciations. In step S912, the scoring result of valid pronunciations is reported to the user. In this case, step S912 reports the user the occurrence of the redundant pronunciations, but is incapable of reporting the contents of the redundant pronunciations. The redundant pronunciations may affect the scoring of valid pronunciations.

If step S904 determines that the number of consecutive invalid frames does not exceed the redundant pronunciation discrimination threshold, the process skips step S906 and directly proceeds to step S910 to score the aligned valid pronunciations. Step S912 reports the scoring result of valid pronunciations to the user.

In an embodiment, when the audio recording includes redundant pronunciations, the word-level or sentence-level scoring directly gives a low score to those redundant the pronunciation of the word or sentence.

In an embodiment, the phoneme-level scoring directly uses a low score to indicate the redundant pronunciation. For example, when the audio recording of practicing the text "How are you?" is "How old are you?", the human-machine interface may show that the user pronounced four words "How old are you?", and the scores of the phonemes of the four words are [−1.26,−1.39], [−50,−50,−50], [−0.93,−0.26], and [−1.24,−2.84]. The redundant word "old" visually reminds the user with the obvious low score [−50,−50,−50]. The scoring method that reflects redundant pronunciations may have other variations.

In an embodiment, the system gives a low score to correspond to the redundant pronunciations of the word "old" (meanwhile, the user may not know why it is given a low score), and then reports the user that the word "old" here is redundant pronunciations. The scoring method that reflects the redundant pronunciations may also have other variations. The user may be requested to re-read the practice text that does not contain the word "old", or the user may be reminded in the other ways.

Any technology that judges the invalid frames of the forcibly aligned result and detects the redundant pronunciations falls within the scope of the disclosure.

The aforementioned various systems running on the data processing server 708 include software and hardware design, which involves software running by high-speed computing hardware.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A speaking practice system with reliable pronunciation evaluation, including:
   a data preprocessing system and a goodness of pronunciation evaluation system running on a data processing server,
   wherein:
   the data preprocessing system includes a phonetic symbol generation system and an audio recording preprocessing system, wherein, according to a practice text as well as an audio recording of a user reading the practice text, the phonetic symbol generation system generates phonetic symbols, and the audio recording preprocessing system generates audio data;
   the goodness of pronunciation evaluation system scores the audio recording based on the phonetic symbols and the audio data;
   the phonetic symbol generation system operates an artificial intelligence model, which is configured to generates the phonetic symbols in response to the practice text including at least one of polyphonic words, wherein the polyphonic words are words having at least two pronunciations and each one of the at least two pronunciations corresponds to a part of speech or a special usage;
   the artificial intelligence model includes a plurality of audio-symbol models corresponding to different polyphonic words; and
   in response to the practice text being an individual word belonging to the polyphonic words, the corresponding audio-symbol model, configured to receive the audio recording and output the phonetic symbols, operates to generate the phonetic symbols according to confidence values of different pronunciations of the individual word that the audio-symbol model evaluates from the audio recording.

2. The speaking practice system with reliable pronunciation evaluation as claimed in claim 1, wherein:
   each audio-symbol model is trained by inputting a plurality of standard pronunciation audios of the corresponding polyphonic word with ideal phonetic symbols of the standard pronunciation audios as output.

3. The speaking practice system with reliable pronunciation evaluation as claimed in claim 1, wherein, after an input layer and prior to an output layer of each audio-symbol model, there are:

a deep neural network; and a fully connected layer.

4. The speaking practice system with reliable pronunciation evaluation as claimed in claim 3, wherein each audio-symbol model comprises:

the input layer, receiving the audio recording;

a feature extraction layer, extracting features of Mel-frequency cepstral coefficients from the audio recording; and a normalization layer, normalizing the features of the Mel-frequency cepstral coefficients to input into the deep neural network.

5. The speaking practice system with reliable pronunciation evaluation as claimed in claim 1, wherein:

the artificial intelligence model further includes a sentence-symbol model; and in response to the practice text being a sentence text and including at least one polyphonic word, the sentence-symbol model operates to generate the phonetic symbols according to the sentence text.

6. The speaking practice system with reliable pronunciation evaluation as claimed in claim 5, wherein:

a training of the sentence-symbol model uses training texts as input, and each training text is a sentence text including at least one polyphonic word; and the training of the sentence-symbol model uses ideal phonetic symbols of each training text as a training goal.

7. The speaking practice system with reliable pronunciation evaluation as claimed in claim 6, wherein the sentence-symbol model further comprises:

an input layer, converting the sentence text including at least one polyphonic word into a sentence vector to be further processed to produce the phonetic symbols corresponding to the sentence text.

8. The speaking practice system with reliable pronunciation evaluation as claimed in claim 7, wherein the sentence-symbol model further comprises:

a word segmentation system, wherein, in response to a need for word segmentation, the sentence vector is segmented by the word segmentation system before being processed to generate the phonetic symbols corresponding to the sentence text.

9. The speaking practice system with reliable pronunciation evaluation as claimed in claim 5, wherein, after an input layer and prior to an output layer of the sentence-symbol model, there are:

an embedding layer;

a first long short-term memory network, implementing an encoder;

a second long short-term memory network, implementing a decoder; and a fully connected layer.

10. The speaking practice system with reliable pronunciation evaluation as claimed in claim 9, wherein:

the sentence-symbol model uses an activation function Softmax.

11. The speaking practice system with reliable pronunciation evaluation as claimed in claim 10, wherein the sentence-symbol model comprises:

the input layer, converting the sentence text including at least one polyphonic words into a sentence vector to be input to the embedding layer.

12. The speaking practice system with reliable pronunciation evaluation as claimed in claim 11, wherein the sentence-symbol model further comprises:

a word segmentation system, segmenting the sentence vector in response to a need for word segmentation, to be input to the embedding layer.

13. The speaking practice system with reliable pronunciation evaluation as claimed in claim 1, wherein:

the phonetic symbol generation system further includes a dictionary; and the phonetic symbol generation system queries the dictionary, to activate the artificial intelligence model when the dictionary shows that the practice text includes at least one polyphonic words.

14. The speaking practice system with reliable pronunciation evaluation as claimed in claim 13, wherein:

the phonetic symbol generation system further determines whether the practice text is a word text or a sentence text;

when the practice text is a word text, the phonetic symbol generation system queries the dictionary to determine whether the word text is the polyphonic word; and when the word text is not the polyphonic word, the phonetic symbol generation system uses a query result from the dictionary as the phonetic symbols.

15. The speaking practice system with reliable pronunciation evaluation as claimed in claim 14, wherein:

in response to the word text being the individual word belonging to the polyphonic words, the corresponding audio-symbol model operates to generate the phonetic symbols based on the audio recording.

16. The speaking practice system with reliable pronunciation evaluation as claimed in claim 14, wherein:

when the practice text is the sentence text, the phonetic symbol generation system queries the dictionary to determine whether the sentence text includes any polyphonic words;

when there is no polyphonic word in the sentence text, the phonetic symbol generation system uses the query result from the dictionary to form the phonetic symbols.

17. The speaking practice system with reliable pronunciation evaluation as claimed in claim 16, wherein the artificial intelligence model further comprises:

a sentence-symbol model; and in response to the practice text being the sentence text and including at least one polyphonic word, the sentence-symbol model operates to generate the phonetic symbols according to the sentence text, wherein the sentence-symbol model determines appropriate phonetic symbols for the at least one polyphonic words in the sentence text based on context of the practice text.

18. The speaking practice system with reliable pronunciation evaluation as claimed in claim 1, wherein:

the goodness of pronunciation evaluation system includes a language model and an acoustic model, operative to force the audio data to align the phonetic symbols that show a text phoneme sequence, and calculate posterior probabilities of a possible phoneme state sequence to score the audio recording, wherein the possible phoneme state sequence is generated by forcibly aligning the audio data to the phonetic symbols.

19. The speaking practice system with reliable pronunciation evaluation as claimed in claim 18, wherein:

a language model construction system for training the language model and an acoustic model construction system for training the acoustic model use training phonetic symbols as training input, wherein the training phonetic symbols are generated by the phonetic symbol generation system that includes the artificial intelligence model.

20. The speaking practice system with reliable pronunciation evaluation as claimed in claim 1, further comprising:

a human-machine interface run on a client device, provided for the user to select the practice text to read out for recording, and upload the practice text and the audio recording to the data processing server.

* * * * *